Sept. 14, 1926.  
R. M. H. PURRMANN  
SPREADING MACHINE  
Filed Dec. 1 1924

INVENTOR.  
Richard M. H. Purrmann  
BY M. C. Frank  
ATTORNEY.

Sept. 14, 1926.

R. M. H. PURRMANN

SPREADING MACHINE

Filed Dec. 1, 1924     3 Sheets-Sheet 2

1,600,014

INVENTOR.
Richard M. H. Purrmann
BY M. C. Frank
ATTORNEY

Sept. 14, 1926.　　　　　　　　　　　　　　　1,600,014
R. M. H. PURRMANN,
SPREADING MACHINE
Filed Dec. 1, 1924　　　3 Sheets-Sheet 3

INVENTOR.
Richard M. H. Purrmann
BY M. C. Frank
ATTORNEY.

Patented Sept. 14, 1926.

1,600,014

UNITED STATES PATENT OFFICE.

RICHARD M. H. PURRMANN, OF OAKLAND, CALIFORNIA.

SPREADING MACHINE.

Application filed December 1, 1924. Serial No. 753,396.

This invention relates to spreading machines, and especially to machines for the spreading of dry fertilizers that have been converted to a disintegrated or powdered state; and also for the spreading of fine dry materials over surfaces, or chemicals over small plants to aid them or destroy bugs and the like injurious to plant life.

The present common method of spreading guano and other light and powdered fertilizers is by hand, or putting the guano in a coarsely woven sack and tamping the filled bag up-and-down over the ground. Both methods are slow, tedious and inefficient and very disagreeable, as any wind lifts the light material, and the air about the distributor is soon permeated with the powder and is obnoxious; also a large percentage of the powder is carried away and consequently lost.

The objects of my invention include the provision of a machine somewhat in the nature of a lawn mower and operated like one, and that will spread graded fertilizer or other material over the ground or surface evenly; a machine having means for feeding the material close to the ground, and changeable to feed material above small plants when desired; a machine that will feed by gravity, or in the case of very fine and light materials have an induced current of air applied thereto to aid in the depositing of the material; and a machine provided with a shakable sifter box adapted to receive screens of different mesh.

The invention possesses other advantageous features, some of which, with the foregoing, will be set forth at length in the following description where I shall outline in full that form of the invention which I have selected for illustration in the drawings accompanying and forming part of the present specification. In said drawings I have shown one form of my invention, but it is to be understood that I do not limit myself to such form, since the invention, as expressed in the claims, may be embodied in a plurality of forms.

Referring to said drawings:—

Adverting to the figures of the drawings, the same will now be described in detail by reference numbers, and the numbers throughout the views will indicate corresponding parts.

Figure 1:
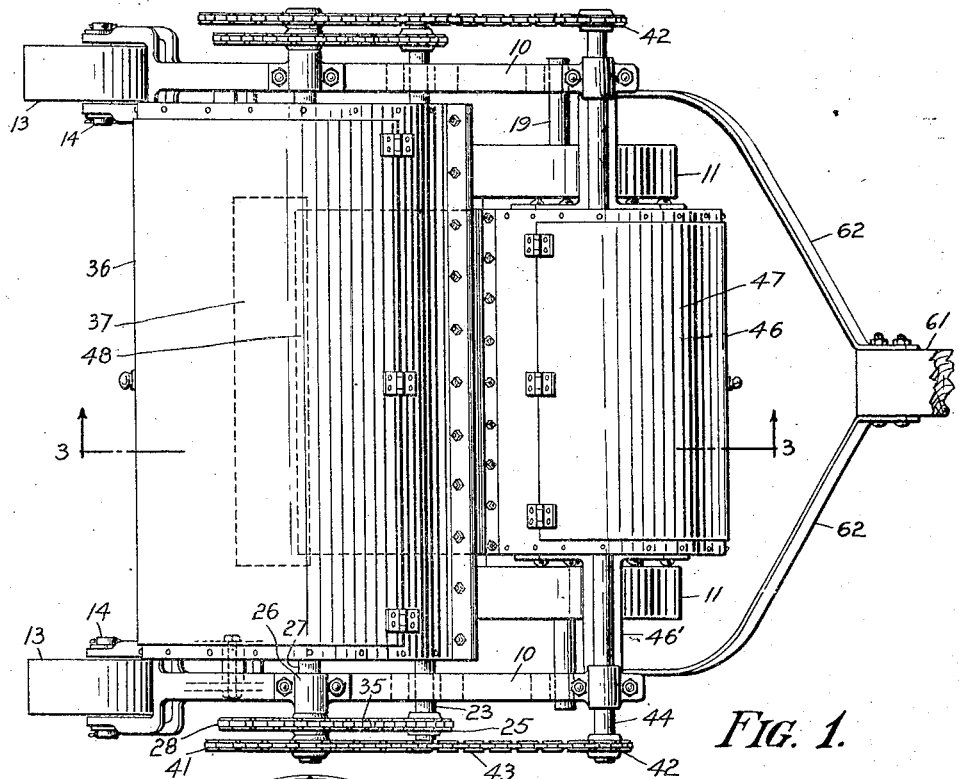
Figure 1 is a plan of the invention, the handle member to the same being broken away.
Figure 2:
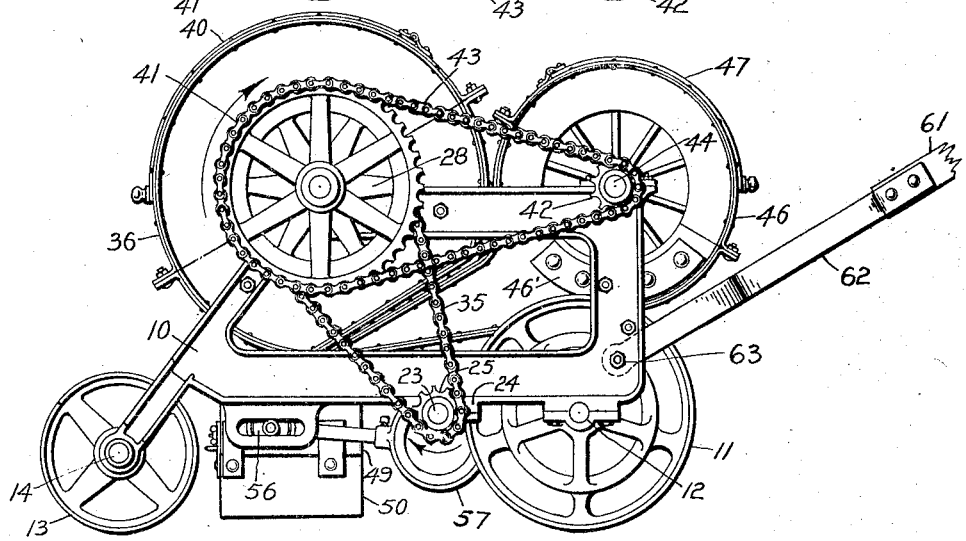
Fig. 2 is a side elevation.
Figure 4:
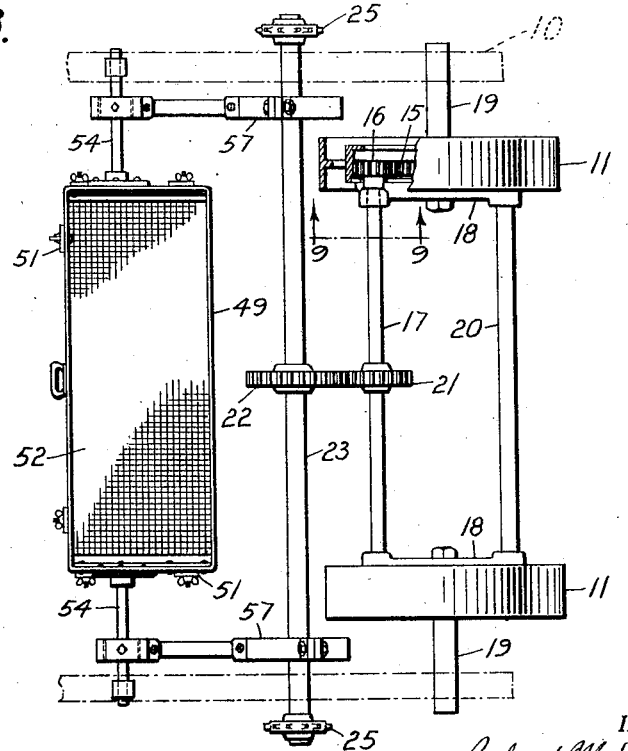
Fig. 4 is a plan of the driving gear disconnected from the supporting frame; the latter is shown in dot-and-dash lines. Part of one drive wheel is broken away to show the drive gear therein.
Figure 9:
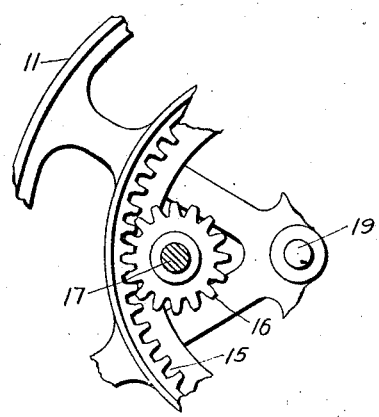
Fig. 9 is a fragmentary view in side elevation of a portion of one of the drive wheels on an enlarged scale and taken on the line 9—9 of Fig. 4.

The reference number 10 indicates the side frames of the structure, and to which are suitably journalled a pair of drive wheels 11 as at 12, Figs. 1 and 2, and idler wheels 13 as at 14. The drive wheels have cast integral therewith an internal ring gear 15, Fig. 9, to which is positioned and engaged a pinion 16. The pinion is rigidly secured to a rotatable shaft 17, Fig. 4, mounted in a plate 18 supported on drive-wheel shaft 19. 20 is a tie rod for the plates 18. So far, the drive means described is quite similar to that of the common lawn mower.

The shaft 17 has fixed thereto at or near its midway position a gear 21, meshing with a gear 22 fixed on a shaft 23. The latter shaft is journalled to each side frame 10 on the under side as at 24, Fig. 2. To each extremity of shaft 23 is fixed a sprocket wheel 25 for a purpose to be later described.

Figure 3:
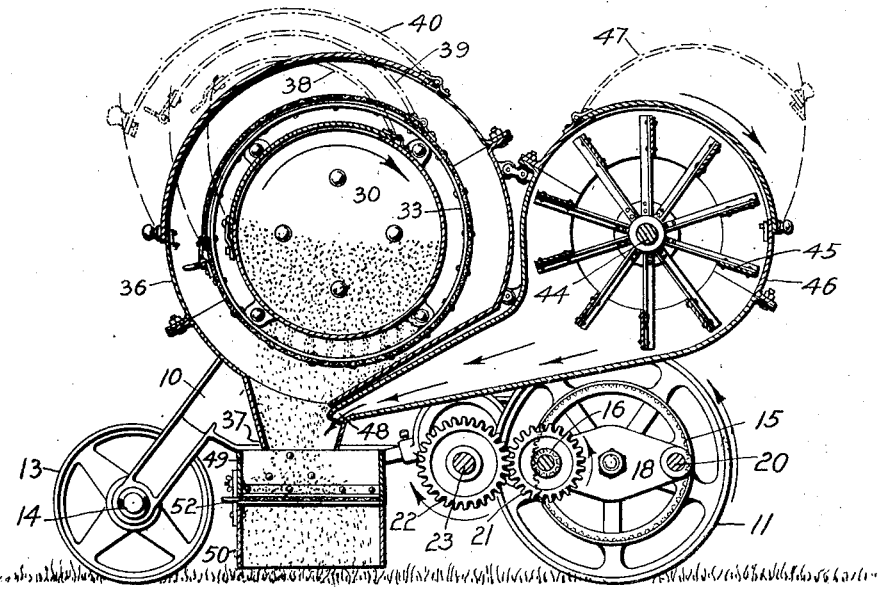
Fig. 3 is a longitudinal vertical section of Fig. 1 along the line 3—3, and shows to advantage the detailed construction and operation of the machine. The dot-and-dash lines indicate the hinged covers to the various chambers and in partially opened positions.

On the top side of each side frame 10 is suitably journalled, as at 26, a short shaft 27. Near the outer end of each shaft is fixed thereto a sprocket wheel 28, and to each inner end is fixed a flange 29, shown clearly in Fig. 6. Between the flanges 29 and secured thereby is a container 30, preferably cylindrical in form, for the reception of the material to be spread, such as guano, bone meal, blood meal, tankage, and so forth, each substance being dry and in more or less powdered form preferably. In Fig. 3 the dotted area indicates the material.

Figure 6:
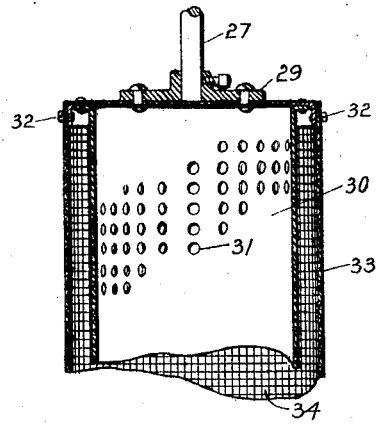
Fig. 6 is a partial sectional plan of the container for the material to be distributed surrounded by a sieve.

The container is perforated with holes 31 of a size for the passage therethrough of all of the fine material and up to a certain grade of coarse material, the tumbling process eventually reducing the coarse material to a powder. Surrounding the container 30 and spaced therefrom and concentrically secured thereto by tap bolts 32, Fig. 6, is a second container 33 of sieve construction having mesh openings 34 of smaller size than the openings 31. The two containers are adapted to revolve as a unit by means of the chain belt 35 engaging the sprocket wheels 25 and 28.

The two revolvable containers 30 and 33 are inclosed in a suitable stationary housing 36. The lowermost part of the housing is formed hopper-like to serve as a discharge outlet 37. Each of the containers and the housing has a suitably hinged and locked cover 38, 39 and 40, and in Fig. 3 the said covers are indicated by dot-and-dash lines as partially raised.

To the extreme outer ends of the shafts 27 are fixed sprocket wheels 41, in alignment with smaller sprocket wheels 42 and adapted to engage the same by the chain belts 43 to drive a fan unit. The unit consists of a shaft 44 journalled on the top side of the side frames 10 and carrying the aforementioned wheels 42 at its extremities, and centrally carrying a rigid structure of fan-blades 45. Surrounding the fan is a housing 46 connected to the side frames by the flanged extension 46'. The upper half of the housing is provided with a cover 47 similar to the other covers, and the lower half terminates in an air outlet spout 48 in direct communication with the previously mentioned discharge outlet 37.

Figure 8:
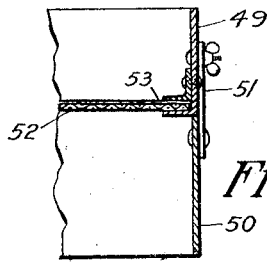
Fig. 8 is a sectional view of one corner of the sifter box along the line 8—8 of Fig. 5, showing in particular the opening for the insertion of the screen plate. The view is shown enlarged.

Directly beneath the latter common outlet is a sifter box of size and shape to accommodate the said outlets. The box consists of an upper portion 49 and a lower portion 50; the latter is removably attachable to the former by side bars 51 or in any other approved manner, Fig. 8, and is arranged to extend downward so that, when the spreading machine is supported upon the ground by the drive and idler wheels 11 and 13, the edges of the lower portion are in close proximity to the ground, as shown in Fig. 3. The upper part 49 of the box is constructed to removably carry at its bottom interchangeable screen plates 52 of different sizes of wire mesh for grading purposes and amount of material distribution over a given area of ground. An opening 53 Fig. 8, is provided of ample width to slide the screen plates in and out. The function of the lower part of the box will be later described in the operation of the spreader.

Figure 7:
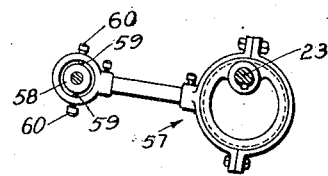
Fig. 7 is a side view of one of the eccentrics of the machine.
Figure 5:
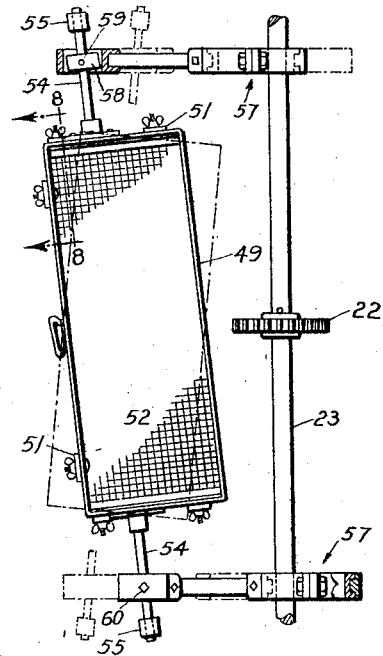
Fig. 5 is a partial plan of the driving gear of Fig. 4 showing the limiting positions of the sifter box in full lines and dot-and-dash lines respectively. Also a bearing and an eccentric is shown in partial section.

The sifter box is at its ends supported and slidably attached to the underside of the frames 10 by rods 54, having roller sleeves 55 at their outer ends engageable in slotted extensions 56 to the frames 10, Fig. 2. On the aforementioned shaft 23 and near its ends are fixedly secured eccentrics 57, detailed in Figs. 5 and 7, and are provided as the means to shake the sifter box by an oscillating movement for the uniform distribution of the material therefrom. On the sifter box rods 54 and in alignment with the eccentrics 57, are collars 58 provided with top and bottom recesses 59 formed by the point of a drill to pivotally engage the pointed ends of set screws 60, Fig. 7.

The operating end of the machine consists of a handle 61 connected to a pair of brace arms 62 pivotally connected to the side frames as at 63 Fig. 2.

Other parts shown in the drawings but not specifically referred to, are ordinary structural parts and need no description.

In operation, the material to be spread is put into the container 30 and all covers closed and locked, and upon pushing the machine by means of the handle 61 the drive wheels function and set the drive shaft 17 into action and in turn countershaft 23. The latter shaft imparts motion to the eccentrics 57 for oscillating the sifter box and to the train of chain belts for revolving the container 30 and its sieve 31 and the fan 45.

The fan revolves at a higher rate of speed than the container, and its function is to blow a current of air into the sifter box to aid and force the precipitated powders through the screen thereof. If the screen plate in the box is of coarse mesh the fan belt 43 may be disconnected, as the shaking of the box by means of the eccentrics 57 will be sufficient to evenly deposit the material on the ground. Again, the surrounding sieve 31, or sifter box, or both, may in many cases be omitted if ungraded material and the uniform distribution of the same is not necessary, such as on rough or plowed ground. On lawns and in the making of new lawns, it is desirable to have the two containers and fan and sifter box in operation; also the box extension 50 positioned as shown in Fig. 3 in order that the fertilizer may be deposited very uniformly and direct into the grass or close to the ground.

The extension 50 should be removed when operating on uneven ground, or when spreading germicides or the like over young plants.

Having thus illustrated and described my invention in the best form as yet devised by me, I wish it understood that changes may be made in it as practice suggests, and I desire patent protection on all such changes and modifications that come within the spirit of the invention as claimed, and which claims are the following:

1. In a spreading machine, the combination of a perforated container, means for rotating said container, a housing surrounding said container and having a discharge outlet below the container, a sifter box supported under said discharge outlet and pneumatic means having a nozzle inserted into said discharge outlet so as to exert a suction upon material in said container and at the same time blow material through said sifter.

2. In a spreading machine the combination of a perforated container, means for rotating said container, a housing surrounding said container and having a discharge outlet below the container, a sifter box supported under said discharge outlet, said sifter box consisting of an upper and a lower portion the upper portion removably carrying a screen at the bottom thereof, the lower portion extending into close proximity of the ground and pneumatic means having a nozzle inserted at an incline into said discharge outlet so as to exert a suction upon material in said container and also blow material through said sifter.

3. In a spreading machine the combination of a perforated container, a housing therefor having a discharge outlet, a sifter box and pneumatic means having a nozzle inserted into said discharge outlet so as to exert a suction upon material in said container and blow the material through said sifter.

In testimony whereof, I affix my signature.

RICHARD M. H. PURRMANN.